(12) United States Patent
Cech et al.

(10) Patent No.: US 9,527,477 B1
(45) Date of Patent: Dec. 27, 2016

(54) SEAT BELT BUCKLE TONGUE ELECTROMAGNETIC COUPLING WITH OPTIONAL WIRELESS SENSOR AND/OR ACTUATOR SYSTEM

(71) Applicant: TK Holdings Inc., Auburn Hills, MI (US)

(72) Inventors: Len Steven Cech, Brighton, MI (US); Dennis Rumps, Howell, MI (US); Gilbert Allan Todd, Clawson, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/728,325

(22) Filed: Jun. 2, 2015

(51) Int. Cl.
*B60R 22/48* (2006.01)
*B60R 22/26* (2006.01)
*A44B 11/25* (2006.01)

(52) U.S. Cl.
CPC .......... *B60R 22/48* (2013.01); *A44B 11/2561* (2013.01); *A44B 11/2565* (2013.01); *B60R 22/26* (2013.01); *B60R 2022/4816* (2013.01)

(58) Field of Classification Search
CPC .............. B60R 2022/1812; B60R 2022/1957; B60R 22/48; B60R 2022/4808; A44B 11/2561; A44B 11/2565
See application file for complete search history.

(56) References Cited

U.S. PATENT DOCUMENTS

| | | | | |
|---|---|---|---|---|
| 5,915,286 | A * | 6/1999 | Figi | B60R 22/48 73/865.9 |
| 7,932,837 | B2 * | 4/2011 | Giesa | B60R 22/48 244/122 R |
| 8,090,504 | B2 * | 1/2012 | Long | B60R 22/48 180/286 |
| 8,289,145 | B2 * | 10/2012 | Miller | B60C 23/0408 340/457 |
| 2004/0017073 | A1 | 1/2004 | Pavlov et al. | |
| 2005/0061568 | A1 * | 3/2005 | Schondorf | B60R 22/48 180/268 |

(Continued)

FOREIGN PATENT DOCUMENTS

| | | | | |
|---|---|---|---|---|
| CA | 2704390 | A1 * | 11/2011 | ............. B60R 22/48 |
| DE | DE 102008026410 | A1 * | 12/2009 | ......... B60R 22/1951 |

(Continued)

OTHER PUBLICATIONS

International Search Report mailed Sep. 9, 2016 issued in PCT/US2016/035014.
Written Opinion mailed Sep. 9, 2016 issued in PCT/US2016/035014.

*Primary Examiner* — Darlene P Condra
(74) *Attorney, Agent, or Firm* — Gordon & Rees LLP

(57) ABSTRACT

A seat belt system for a vehicle having a seat belt mounted to a vehicle seat or a portion of a vehicle structure, a tongue which can slide is attached to the seat belt, and a buckle that receives and locks the tongue in an attached state such that the seat belt restrains an occupant in the vehicle seat. A primary coil is included in the buckle and is electrically connected to at least one primary circuit. At least one secondary coil is included in the tongue and is electrically connected to at least one secondary circuit. The primary coil and the at least one secondary coil are configured to be electromagnetically coupled when the buckle and tongue are in the attached state.

20 Claims, 2 Drawing Sheets

(56) References Cited

U.S. PATENT DOCUMENTS

| | | | |
|---|---|---|---|
| 2008/0238647 A1* | 10/2008 | Abe | B60R 22/48 340/457.1 |
| 2010/0013622 A1* | 1/2010 | Rumps | A44B 11/2565 340/457.1 |
| 2010/0265056 A1* | 10/2010 | Lai | B60R 22/48 340/457.1 |
| 2010/0283593 A1* | 11/2010 | Miller | B60C 23/0408 340/447 |
| 2013/0033382 A1 | 2/2013 | Fung et al. | |
| 2014/0266663 A1* | 9/2014 | Schlaps | B60R 22/48 340/457.1 |
| 2015/0145666 A1* | 5/2015 | Sugawara | B60R 22/48 340/457.1 |
| 2016/0159320 A1* | 6/2016 | Andreen | B60R 22/48 382/103 |

FOREIGN PATENT DOCUMENTS

| | | |
|---|---|---|
| EP | 1 669 249 A1 | 6/2006 |
| KR | 10-2014-0076368 | 6/2014 |
| KR | 10-1427922 | 8/2014 |

\* cited by examiner

SEAT BELT BUCKLE TONGUE ELECTROMAGNETIC COUPLING WITH OPTIONAL WIRELESS SENSOR AND/OR ACTUATOR SYSTEM

BACKGROUND

Conventional seat belt systems for vehicle seats include two components, the buckle assembly and the tongue assembly. If an occupant is not present in the vehicle seat, the buckle and the tongue are not physically attached. After an occupant enters the vehicle seat, the occupant inserts the tongue into the buckle, where a mechanical actuator in the buckle locks the tongue rigidly in an attached state, thereby restraining the occupant in the vehicle seat. To break the mechanical attachment and return to the unattached state, the occupant presses a button on the buckle, which disables the attached state. Often the tongue and mechanical actuator are formed of metal. In addition, a switch is generally included within the buckle to detect when the buckle assembly is properly buckled.

Electromechanical devices and sensors also may be integrated into the seat belt in order to support additional safety functions. Currently, belt-integrated sensors and actuators require wiring through the entire belt assembly from the retractor or the belt base in order to receive power from a power supply or receive and transmit data from a control unit. Such wiring, however, adds additional cost and complexity to the system.

SUMMARY

One disclosed embodiment relates to a seat belt system for a vehicle. The seat belt system has a seat belt mounted to a vehicle seat or a portion of a vehicle structure and a tongue which can slide attached to the seat belt. The seat belt system further includes a buckle configured to receive and lock the tongue in an attached state such that the seat belt restrains an occupant in the vehicle seat. The tongue and buckle have the capability to be released or separated from the locked condition. A primary coil is included in the buckle and is electrically connected to at least one primary circuit. At least one secondary coil is included in the tongue and is electrically connected to at least one secondary circuit. The primary coil and the at least one secondary coil are configured to be electromagnetically coupled when the buckle and tongue are in the attached state.

Another disclosed embodiment relates to a seat belt system for a vehicle seat having a seat belt with a tongue which can slide attached and a buckle configured to receive and lock the tongue in an attached state. The tongue and buckle have the capability to be released or separated from the locked condition. A primary circuit is included in the buckle. At least one secondary circuit is included in the tongue. The primary circuit and the at least one secondary circuit are configured to be electromagnetically coupled when the buckle and tongue are in close proximity.

Yet another disclosed embodiment relates to a seat belt system for a vehicle seat having a seat belt with a tongue which can slide attached and a buckle configured to receive and lock the tongue in an attached state. The tongue and buckle have the capability to be released or separated from the locked condition. The buckle and the tongue are further configured to be electromagnetically coupled when the buckle and tongue are in the attached state such that power and/or data may be transmitted between the buckle and tongue.

It is to be understood that both the foregoing general description and the following detailed description are exemplary and explanatory only, and are not restrictive of the invention as claimed.

BRIEF DESCRIPTION OF THE DRAWINGS

Features, aspects, and advantages of the present invention will become apparent from the following description, appended claims, and the accompanying exemplary embodiments shown in the drawings, which are briefly described below.

DETAILED DESCRIPTION

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Figure 1:
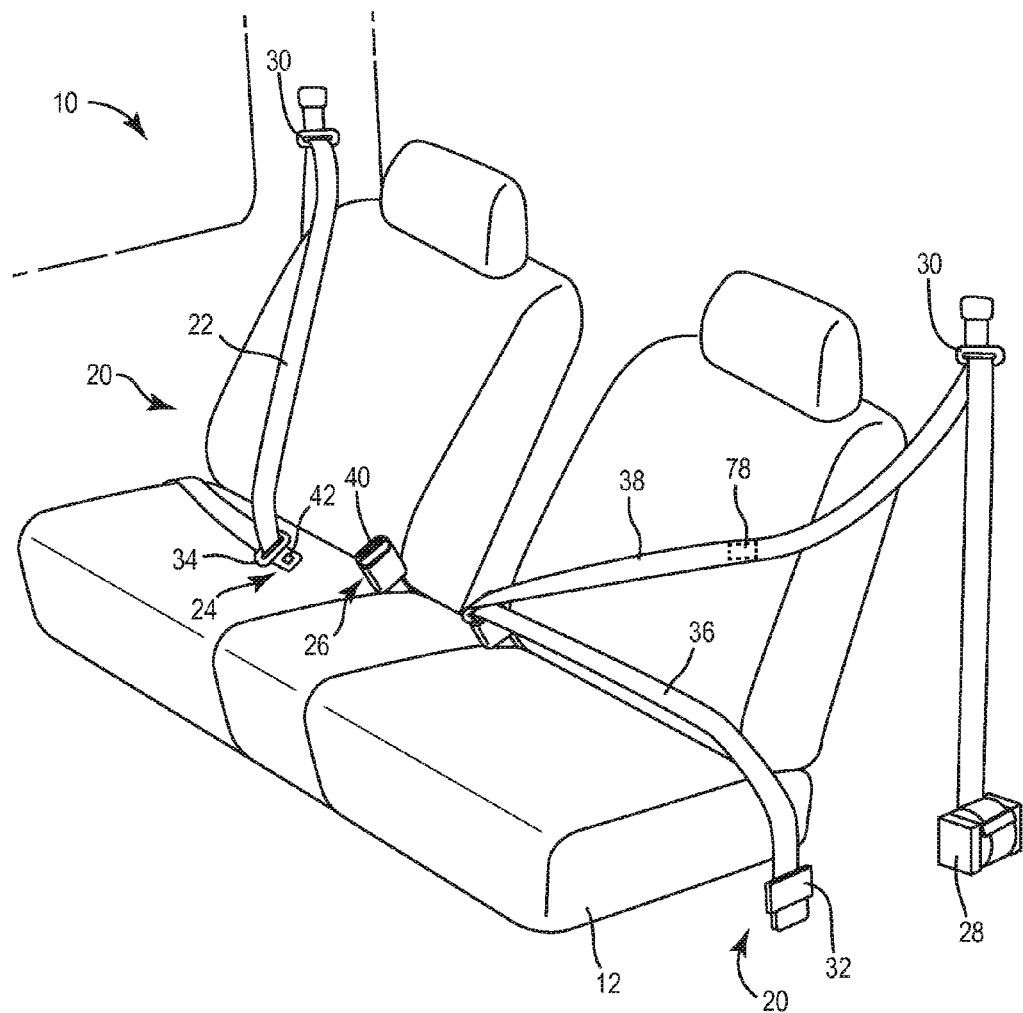
FIG. 1 is a perspective view of an occupant restraint system, according to an exemplary embodiment.

FIG. 1 illustrates a portion of a vehicle interior 10, including a vehicle occupant restraint system, such as a seat belt system 20 for use in a passenger vehicle. The seat belt system 20 generally includes a belt 22 (e.g. a webbing, a strap, etc.), a tongue 24, and a mateable buckle 26. Upon attaching the tongue 24 to the buckle 26, the belt 22 is latched across the occupant to secure the occupant to the vehicle seat 12. Sensors and various electromechanical devices may be integrated into the seat belt system 20 to enhance safety functions of the system. For example, a sensor 78 may be integrated with the belt 22 to collect data regarding the physiological state of the occupant or general use of the system by the occupant. In addition, actuators may be incorporated into the seat belt system 20 that provide tensioning adjustment to the belt 22 in certain events, such as, for example, pre-crash, crash, or other threat conditions. The use of such sensors and electromechanical devices in connection with the seat belt system 20 is described in more detail below.

The belt 22 is configured to extend and retract across the occupant when seated. The belt 22 may be formed of a woven nylon material, which is threaded through the tongue 24 via an opening 33 in a striker portion 42. The tongue 24 slides with respect to the belt 22 when in an unbuckled position, allowing the seat belt 22 to be utilized for a wide range of occupant sizes and seating positions. The belt 22 is connected to a belt retractor 28 that is configured to guide the belt 22 between winding and unwinding. The retractor 28 may include a mechanism configured to pretension the belt 22 in the winding direction. The mechanism may include a plurality of springs, for example. The buckle 26 may be fixed with respect to the vehicle, such as the vehicle floor, vehicle seat, or any other appropriate vehicle structure. For example, the buckle 26 may be anchored to the vehicle frame so that the seat belt 22 is secured or locked in place when it is attached to the buckle 26. When the tongue 24 and the buckle 26 are secured, the belt 22 extends from a floor anchor 32, crosses the waist of the occupant, and passes through the tongue housing 34 to form a lap portion 36 of the occupant restraint system 20. The belt 22 crosses diagonally across the torso of the occupant to a shoulder anchor 30 (e.g., a ring assembly, a D-ring, etc.) to form a shoulder portion 38 of the occupant restraint system 20, and then leads into the retractor housing 28 where it terminates in a spool which rotates relative to the fixed housing.

Figure 2:
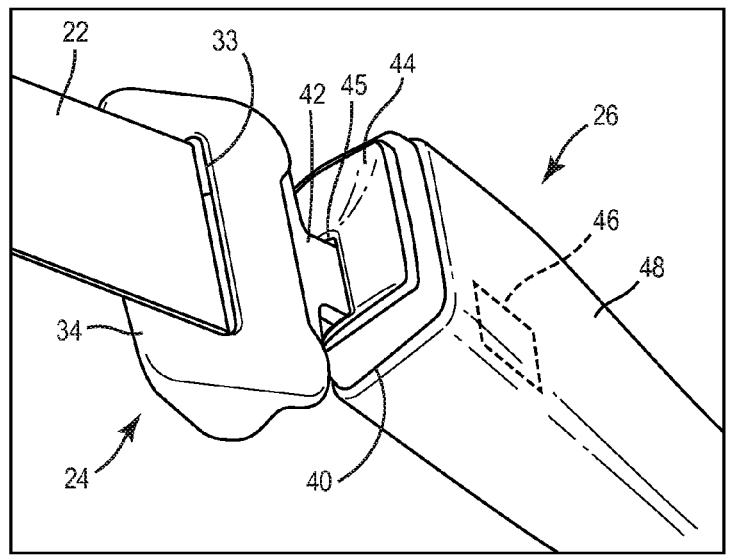
FIG. 2 is a perspective view of a tongue and a buckle of the occupant restraint system of FIG. 1.

As shown in FIG. 2, the buckle 26 includes a latch 40 to prevent unwanted disengagement of the tongue. The latch 40 may be formed, for example, from a metal or metal alloy. The latch 40 is configured to secure the striker portion 42 of the tongue 24. The striker portion 42 also may be formed from a metal or metal alloy. In addition, the striker portion 42 may be partially covered by a tongue housing 34, which may be formed, for example, as a hollow plastic member that partially frames the striker portion 42. The latch 40 is further configured to selectively release the striker portion 42 of the tongue 24, either manually or automatically, such as with the depression of a user interface, which is shown in FIG. 2 as a button 44. The button 44 may be provided on the distal end of the buckle 26 and defines an opening 45 into which the striker portion 42 is inserted to engage the latch 40. The buckle 26 may further include an internal switch 46 included within a housing 48 of the buckle 26 that is configured to detect when the striker portion 42 and the latch 40 are engaged or disengaged. The switch 46 may, for example, be an electromechanical switch. The switch 46 may communicate to the vehicle whether the latch 40 of the buckle 26 and the striker portion 42 of the tongue 24 are in an "attached" or "unattached" state via electrical wiring contained in the buckle 26.

Figure 3:
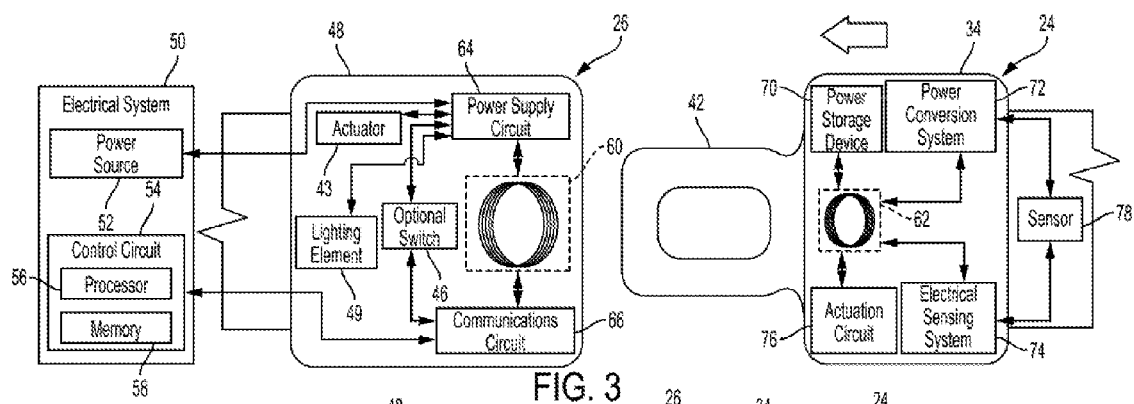
FIG. 3 is a block diagram of the tongue and the buckle of FIG. 2 in an uncoupled state, according to an exemplary embodiment.
Figure 4:
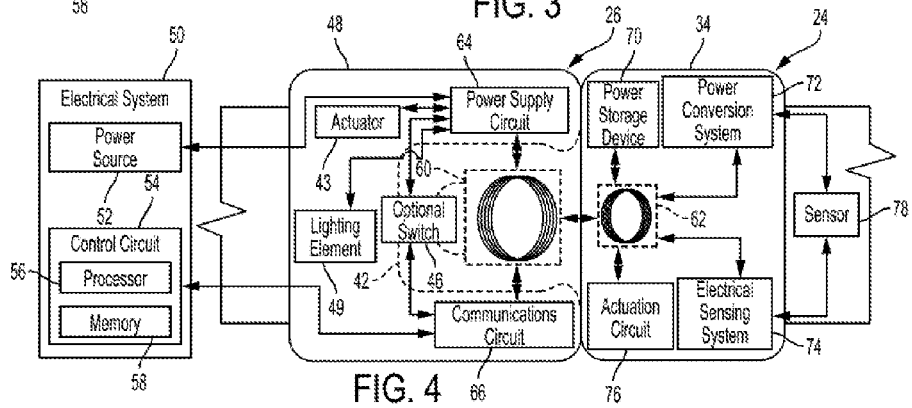
FIG. 4 is a block diagram of the tongue and buckle of FIG. 2 in a coupled state, according to an exemplary embodiment.

As shown in FIGS. 3 and 4, the buckle 26 may communicate with the vehicle via signals passing through electrical wires (represented as double arrows) coupling the buckle 26 to an electrical system 50. Electromechanical devices may then be integrated into the buckle 26, including, but not limited to, lighting elements 49, vibrating actuators 43, and electromechanical motors, all of which may facilitate ingress and egress movement of the buckle or general use of the occupant restraint system 20. The electrical system 50 further may include a power source 52, configured to provide electrical power, and a control circuit 54 (e.g., a controller, a processor circuit, etc.), configured to provide control signals.

The power source 52 may provide electrical power to the components of the buckle 26 and, as described in more detail below, other components of the seat belt system 20. The power source 52 may be connected (e.g., wired) to a vehicle power supply system. The power source 52 may be integrated into the vehicle power supply system or may be independent of the vehicle power supply system. For example, the power source 52 may be a dedicated battery or other electrical storage device that provides power only to the buckle 26.

The control circuit 54 may contain circuitry, hardware, and/or software for facilitating or performing a variety of functions. The control circuit 54 may handle inputs, process inputs, run programs, handle instructions, route information, control memory, control a processor, process data, generate outputs, communicate with other devices or hardware, or otherwise perform general or specific computing tasks. The control circuit 54 may, for example, be an electronic control unit for a vehicle. The control circuit 54 also may include a processor 56. The processor 56 may be implemented as any suitable electronic processing component, such as, for example, a general-purpose processor, an application-specific integrated circuit ("ASIC"), one or more field-programmable gate arrays ("FPGAs"), a digital-signal-processor ("DSP"), or a group of processing components. The control circuit 54 may include a further connection to another vehicle communication system such as, for example, a CAN bus.

The control circuit 54 may include memory 58, which may be one or more devices (e.g. RAM, ROM, flash memory, hard disk storage, etc.) for storing data and/or computer code for facilitating the various processes performed by the control circuit 54. The memory 58 may be, or include, non-transient volatile memory or non-volatile memory. The memory 58 also may include any type of information structure for supporting the various activities and information structures performed by the system, such as database components, object code components, and script components. The memory 58 is in direct communication with the processor 56 and provide computer code or instructions to processor for executing the processes described herein.

The seat belt system 20 includes an electromagnetic primary coil 60 that is provided in the buckle 26 and at least one electromagnetic secondary coil 62 that is provided in the tongue 24, both of which are represented schematically in FIGS. 3 and 4. In an attached state (e.g., when the striker portion 42 of the tongue 24 engages the latch 40 of the buckle 26), the primary coil 60 and the secondary coil 62 are inductively coupled. The mechanical interconnection of the striker portion 42 and the latch 40 fix the relative positions of the primary coil 60 and the secondary coil 62. The striker portion 42 may be positioned relative to the primary coil 60 and the secondary coil 62 to serve as a metal core linking the primary coil 60 and secondary coil 62 to improve power and/or communication coupling. For example, the primary coil 60 may be provided about the periphery of or within the housing 48 of the buckle, and the secondary coil 62 may be provided about the periphery of or within the tongue housing 34. The striker portion 42 may extend into the tongue housing 34 such that, when the tongue 24 is coupled to the buckle 26, one end of the striker portion 42 is surrounded by the primary coil 60 while the opposite end of the striker portion 42 is surrounded by the secondary coil 62, as shown in FIG. 4.

Once an electromagnetic coupling is established between the primary coil 60 and the secondary coil 62, power and data may be transferred. Data may be exchanged between the primary coil 60 and the secondary coil 62 through various methods including, but not limited to, low-power Bluetooth, WiFi, near field communication ("NFC"), or simple controlled modulation of the primary and/or secondary coil circuits. Through the inductive coupling between the primary coil 60 and the secondary coil 62, power and/or data may pass between the buckle 26 and the tongue 24 without direct physical contact of the power and/or data conducting members connected to the tongue 24 and the buckle 26.

To facilitate power and data transfer, the buckle 26 may include a power supply circuit 64 and/or a communications circuit 66. The power supply circuit 64 and the communications circuit 66 may be included within the housing 48 of the buckle 26 such that they do not interfere with the coupling of the striker portion 42 and the latch 40. The power supply circuit 64 is connected to the power source 52 and to the primary coil 60. The power supply circuit 64 may be a simple connection that directly couples the primary coil 60 to the power source 52 or may include components to alter (e.g., rectify, invert, step-up, step-down, condition, etc.)

the electrical power between the power source 52 and the primary coil 60. The communications circuit 66 is connected to the control circuit 54 and to the primary coil 60. The communications circuit 66 may be a simple connection that directly couples the primary coil 60 to the control circuit 54 or may include components such as additional processors to alter data passing between the primary coil 60 and the control circuit 54.

The tongue 24 may include a power storage device 70, a power conversion system 72, an electrical sensing system 74, and/or an actuation circuit 76. One or more of the power storage device 70, the power conversion system 72, the electrical sensing system 74, or the actuation circuit 76 may be included within the tongue housing 34 or within a separate housing coupled to the tongue 24.

The power storage device 70 is connected to the secondary coil 62. The power storage device 70 is charged with electrical power from the power source 52 through the inductive coupling between the primary coil 60 and the secondary coil 62. The power storage device 70 may be any device suitable for storing electrical energy. For example, the power storage device 70 may a rechargeable electrochemical cell or battery (e.g., a suitable battery could include Ni—Cd, NiMH, Li-ion, Li polymer, etc.), a capacitor, supercapacitor, or any other device or combination of devices capable of storing electrical energy.

The power conversion system 72 is connected to the secondary coil 62. The power conversion system 72 may include components to alter (e.g., rectify, invert, step-up, step-down, condition, etc.) the electrical power between the secondary coil 62 and the power storage device 70, the electrical sensing system 74, the actuation circuit 76, the sensor 78, and other devices (e.g., sensors, actuators, lights, etc.) included in the tongue 24 or in other components connected to the tongue 24 (e.g., belt 22, shoulder anchor 30, retractor 28, etc.).

The power storage device 70 and/or the power conversion system 72 provide electrical power to components included on the tongue 14 or the belt 22 without direct contact being needed between conductive members coupled to the tongue 24 and the buckle 26. Further, by providing power storage in the tongue 24 with the power storage device 70, the power conversion system 72, the electrical sensing system 74, the actuation circuit 76, the sensor 78 and other devices (e.g., sensors, actuators, lights, etc.) included in the tongue 24 or in the belt 22 coupled to the tongue 24 may receive power even when the tongue 24 is disengaged from the buckle 26.

The electrical sensing system 74 may communicate with one or more sensors 78 included on the tongue 24 or on the belt 22 coupled to the tongue 24 to monitor the use of the occupant restraint system 20 and/or collect data concerning the occupant using the occupant restraint system 20. The sensor 78 communicates collected data to the control circuit 54 via the inductive coupling between the primary coil 60 and the secondary coil 62. While the sensor 78 is shown schematically in FIGS. 3 and 4 as a single sensor included on the belt 22 coupled to the tongue 24, the sensor 78 alternatively may be included on the tongue 24 (e.g., on the striker portion 42 or the tongue housing 34). The sensor 78 also may include multiple sensors included in various locations on the tongue 24, the belt 22 or any other component associated with the seat belt system 20 (e.g., the refractor 28).

The sensor 78 may be utilized to estimate the stature of the occupant based on the occupant's use of the seat belt system 20. For example, the sensor 78 may be one or more accelerometers included within the tongue housing 34. The accelerometer may track the movement of the tongue 24 by the occupant's hand, during ingress, from a stowed position to engaging the buckle 26 to estimate the occupant's stature. Alternatively, the sensor 78 may be an encoder (e.g., an optical encoder) that is configured to monitor belt payout through the tongue housing 34 to estimate occupant stature (e.g., through absolute and/or relative encoded information on the belt 22). Alternatively, the sensor may be composed of a gear system (which steps down the turn ratio of the refractor) attached to a rotational potentiometer.

The sensor 78 also may be utilized to collect other biological data from the occupant. For example, the sensor 78 may be included on a portion of the belt 22 that is positioned over the chest of the occupant and may be configured to collect a variety of data, including, but not limited to, occupant physiological data, such as movement, heart rate, respiration rate, or detect or measure biochemical analytes through respiration, perspiration or other physiological processes.

In addition, the sensor 78 may be utilized to monitor the tongue 24 and the buckle 26 or the proper use of the seat belt system 20. For example, the sensor 78 may be configured to detect the electromagnetic coupling levels when the tongue 24 is properly locked into the buckle 26. The sensor 78 may therefore replace the switch 46 as a means for detecting the state of the buckle assembly. The sensor 78 also may be utilized to detect misuse of the seat belt system 20, such as by detecting belt placement behind or under the occupant. The sensor 78 additionally may be utilized to detect due care situations, such as the presence or positioning of a car seat or whether the buckle 26 and the tongue 24 are in a non-occupant attached state.

The actuation circuit 76 is configured to actuate a portion of the seat belt system 20 based on control signals from the control circuit 54 that are transmitted to the actuation circuit through the inductive coupling between the primary coil 60 and the secondary coil 62.

The actuation circuit 76 may be coupled to an actuator, indicator, or other device included on the tongue 24 and configured to act upon the tongue 24. For example, the actuation circuit 76 may be configured to activate a motor to vibrate the tongue 24 as a warning device, or may be configured to activate a light or sound device to provide a warning or indicator to the occupant (e.g., if the tongue 24 is not properly coupled to the buckle 26). Alternatively, the actuation circuit 76 may be coupled to an actuator, indictor, or other device that is configured to act upon another body. For example, the actuation circuit 76 may be configured to activate an actuator in the tongue housing 34 to lock the belt 22 in the tongue housing 34 to provide enhanced restraint during pre-crash, crash, or other threat conditions. Such an actuator may be utilized in combination with other active belt functions, such as a motorized seat belt function.

The actuation circuit 76 may be coupled to an actuator, indicator, or other device in another portion of the seat belt system 20. For example, the actuation circuit 76 may be configured to activate an actuator in the shoulder anchor 30 to adjust tension (e.g., looser or tighter) to achieve a target belt tension. The actuation circuit 76 may activate any other electromechanical reversible and/or non-reversible features embedded in the seat belt or other components of the occupant restraint system 20, such as in response to pre-crash, crash, or other threat conditions detected by other sensors and communicated to the actuation circuit from the control circuit 54 through the inductive coupling between the primary coil 60 and the secondary coils 62.

The electromagnetic coupling of the seat belt system 20 allows for wireless sensors and/or actuators to be integrated into the tongue housing or in other components of the seat belt system 20 without the requirement of extensive wiring through the entire belt assembly. The system allows for use of existing power and communications wiring in the buckle assembly to provide additional features and functions and may also replace the switch as a means to detect proper attachment of the buckle and tongue, thereby reducing parts while adding functionality.

The construction and arrangement of the elements of the electromagnetic coupling system as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. Some like components have been described in the present disclosure using the same reference numerals in different figures. This should not be construed as an implication that these components are identical in all embodiments; various modifications may be made in various different embodiments. It should be noted that the elements and/or assemblies of the enclosure may be constructed from any of a wide variety of materials that provide sufficient strength or durability, in any of a wide variety of colors, textures, and combinations.

What is claimed is:

1. A seat belt system for a vehicle comprising:
a seat belt mounted to a vehicle seat or a portion of a vehicle structure, the seat belt having a tongue attached, wherein the tongue can slide relative to the seat belt;
a buckle configured to receive and lock the tongue in an attached state such that the seat belt restrains an occupant in a vehicle seat;
a primary coil included in the buckle, wherein the primary coil is electrically connected to at least one primary circuit; and
at least one secondary coil included in the tongue, wherein the at least one secondary coil is electrically connected to at least one secondary circuit;
wherein the primary coil and the at least one secondary coil are configured to be electromagnetically coupled when the buckle and tongue are in the attached state.

2. The seat belt system of claim 1, wherein the at least one primary circuit is configured to transmit data to or receive data from a vehicle communications unit, and wherein the primary coil transmits the data to or receives the data from the at least one secondary coil.

3. The seat belt system of claim 2, wherein the at least one secondary circuit is electrically connected to at least one sensor and wherein the data transmitted to or received from the at least one secondary coil is transmitted to or received from the at least one sensor.

4. The seat belt system of claim 3, wherein the sensor is configured to measure physiological data of the occupant.

5. The seat belt system of claim 3, wherein the sensor is configured to measure seat belt movement through the tongue.

6. The seat belt system of claim 5, wherein the sensor is further configured to estimate occupant size based on the measured seat belt movement.

7. The seat belt system of claim 3, wherein the sensor is configured to measure a change in current in the at least one secondary coil and to detect the attached state of the buckle and tongue based on the measured change in current.

8. The seat belt system of claim 3, wherein the sensor is included in or on the seat belt.

9. The seat belt system of claim 3, wherein the sensor is configured to detect seat belt placement relative to the occupant.

10. The seat belt system of claim 1, wherein the primary circuit is configured to receive power from a power source, and wherein the primary coil transmits the power to the at least one secondary coil.

11. The seat belt system of claim 10, wherein the at least one secondary circuit is electrically connected to at least one power storage device and wherein the power transmitted to the at least one secondary coil is stored in the at least one power storage device.

12. The seat belt system of claim 11, wherein the at least one power storage device is configured to transmit the stored power to at least one of a sensor and an actuator when the buckle and the tongue are in an unattached state.

13. The seat belt system of claim 10, wherein the at least one secondary circuit is electrically connected to at least one actuator and wherein the power transmitted to the at least one secondary coil is transmitted to the at least one actuator.

14. The seat belt system of claim 13, wherein the actuator is configured to vibrate the tongue.

15. The seat belt system of claim 13, wherein the actuator is configured to adjust the seat belt tension through the tongue.

16. The seat belt system of claim 13, wherein the actuator is configured to lock relative movement of the seat belt through the tongue.

17. The seat belt system of claim 10, wherein the power source is a battery included in or on the buckle.

18. The seat belt system of claim 10, wherein the at least one secondary circuit is electrically connected to at least one lighting element and wherein the power transmitted to the at least one secondary coil is transmitted to the at least one lighting element.

19. A seat belt system for a vehicle seat comprising:
a seat belt having a tongue attached;
a buckle configured to receive and lock the tongue in an attached state;
a primary circuit included in the buckle; and
at least one secondary circuit included in the tongue;
wherein the primary circuit and the at least one secondary circuit are configured to be electromagnetically coupled when the buckle and tongue are in close proximity.

20. A seat belt system for a vehicle seat comprising:
a seat belt having a tongue attached; and
a buckle configured to receive and releasably lock the tongue in an attached state,
wherein a primary coil included in the buckle and a secondary coil included in the tongue are configured to be electromagnetically coupled when the buckle and tongue are in the attached state such that at least one of power and data may be transmitted between the buckle and tongue.

* * * * *